US012392322B1

(12) United States Patent
Nayebi et al.

(10) Patent No.: US 12,392,322 B1
(45) Date of Patent: Aug. 19, 2025

(54) WIND TURBINE SPINNING RESERVE WITH SELECTABLE CONFIDENCE LEVEL

(71) Applicant: VESTAS WIND SYSTEMS A/S, Aarhus N (DK)

(72) Inventors: Kouroush Nayebi, Ikast (DK); Jacob Jensen, Skødstrup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 19/050,435

(22) Filed: Feb. 11, 2025

(30) Foreign Application Priority Data

Jul. 9, 2024 (DK) .............................. PA202430398

(51) Int. Cl.
F03D 7/02 (2006.01)
F03D 7/04 (2006.01)

(52) U.S. Cl.
CPC ........... F03D 7/0276 (2013.01); F03D 7/043 (2013.01); F05B 2270/101 (2013.01); F05B 2270/335 (2013.01)

(58) Field of Classification Search
CPC .. F03D 7/0276; F03D 7/043; F05B 2270/101; F05B 2270/335
See application file for complete search history.

(56) References Cited

U.S. PATENT DOCUMENTS

| | | | | |
|---|---|---|---|---|
| 8,963,353 | B1 * | 2/2015 | Ekanayake | F03D 7/0284 290/43 |
| 9,859,828 | B2 * | 1/2018 | Tarnowski | H02J 3/28 |
| 10,968,891 | B2 * | 4/2021 | Gupta | H02J 3/381 |
| 11,421,654 | B2 * | 8/2022 | Garcia | H02J 3/381 |
| 11,641,115 | B2 * | 5/2023 | Brombach | H02J 3/46 700/286 |

(Continued)

FOREIGN PATENT DOCUMENTS

| | | |
|---|---|---|
| EP | 3807530 A1 | 4/2021 |
| EP | 4304040 A1 | 1/2024 |
| WO | 2024094263 A1 | 5/2024 |

OTHER PUBLICATIONS

Danish Search Report issued to patent application No. PA202430398 on Jan. 20, 2025.

*Primary Examiner* — Tulsidas C Patel
*Assistant Examiner* — Thomas K Quigley
(74) *Attorney, Agent, or Firm* — Patterson + Sheridan, LLP; Gero G. McClellan

(57) ABSTRACT

Control techniques for controlling a reliability of a spinning reserve of a wind turbine to be tailored to a user's reliability preference are disclosed. In one aspect, a control technique includes operating a wind turbine in a spinning reserve mode to provide a spinning reserve; calculating an available power of the wind turbine when operating in the spinning reserve mode; defining a reliability band around the calculated available power; selecting a reliability factor that defines a probability that a reliable available power within the reliability band is below the real available power; determining the reliable available power based on the selected reliability factor and the reliability band; determining a power setpoint for the wind turbine based on a difference between a desired spinning reserve and the determined reliable available power; and controlling the wind turbine to operate in the spinning reserve mode in accordance with the power setpoint.

16 Claims, 8 Drawing Sheets

(56) References Cited

U.S. PATENT DOCUMENTS

| | | | | |
|---|---|---|---|---|
| 11,686,265 | B2* | 6/2023 | Blood | F02B 77/04 |
| | | | | 290/51 |
| 12,113,358 | B2* | 10/2024 | Lyhne | H02J 3/32 |
| 12,253,064 | B2* | 3/2025 | Kidmose | F03D 7/0224 |
| 2011/0224926 | A1 | 9/2011 | Morjaria et al. | |
| 2015/0292484 | A1* | 10/2015 | Haj-Maharsi | F03D 15/10 |
| | | | | 290/44 |
| 2015/0381089 | A1* | 12/2015 | Tarnowski | H02J 3/32 |
| | | | | 290/44 |
| 2017/0335824 | A1* | 11/2017 | Gupta | H02J 3/16 |
| 2019/0003456 | A1* | 1/2019 | Garcia | G05B 15/02 |
| 2020/0200145 | A1 | 6/2020 | Zinck et al. | |
| 2022/0220938 | A1* | 7/2022 | Nayebi | G06Q 10/06 |

* cited by examiner

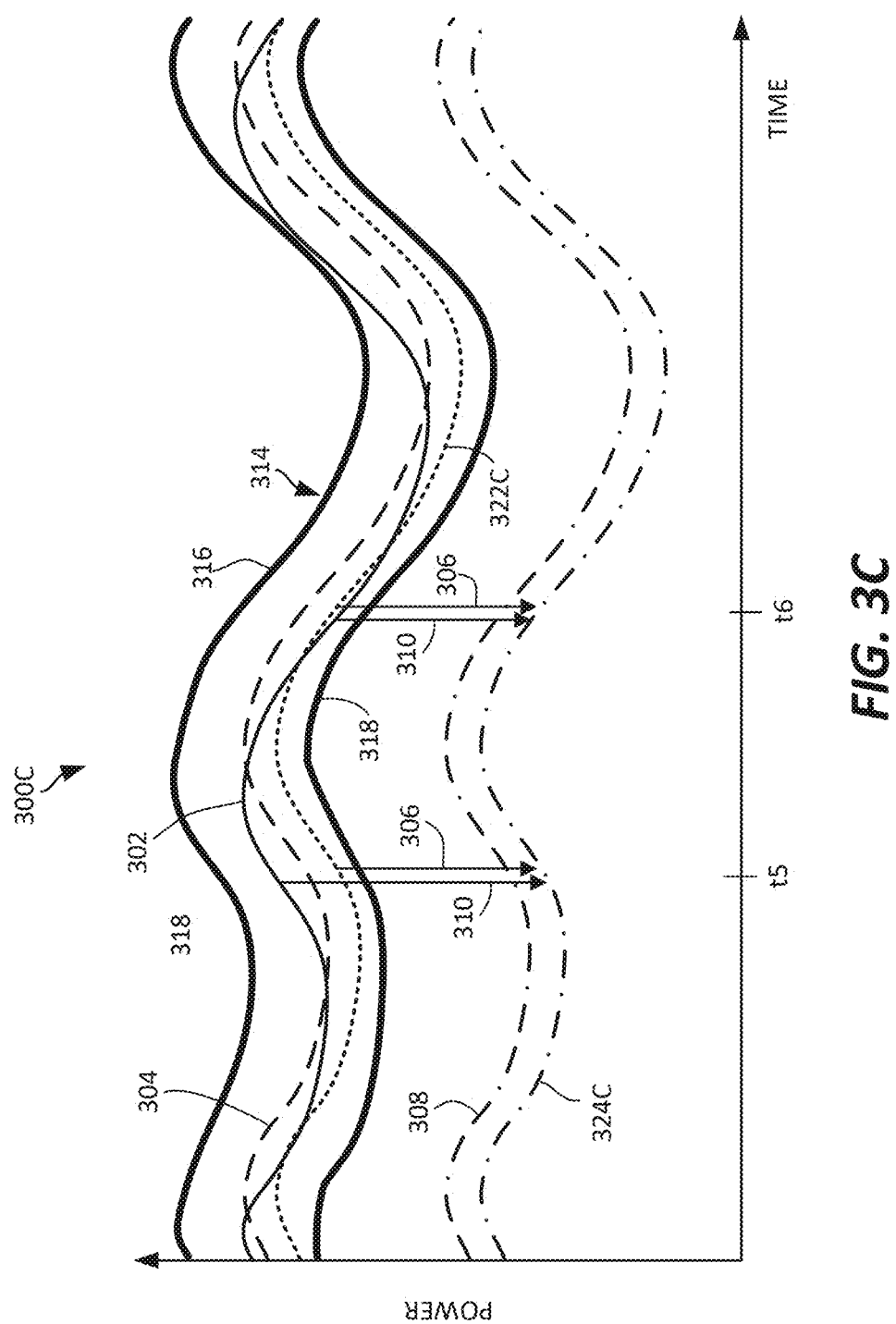

WIND TURBINE SPINNING RESERVE WITH SELECTABLE CONFIDENCE LEVEL

FIELD

Embodiments presented in this disclosure generally relate to control of wind turbines, and more particularly, to controlling wind turbines to allow for a reliability of a spinning reserve of a wind turbine to be tailored to a user's reliability preference.

BACKGROUND

When running a wind turbine in a spinning reserve mode, the amount of power reserved can be based on the calculated available power of the wind turbine. The accuracy of the amount of power reserved depends on both the accuracy and precision of the calculated available power. Conventionally, available power calculations have proved to be inaccurate. Consequently, maintaining a spinning reserve with high accuracy has been challenging.

SUMMARY

One embodiment of the present disclosure is directed to a method. The method includes operating a wind turbine in a spinning reserve mode to provide a spinning reserve, the spinning reserve being an extra power generating capacity of the wind turbine that is available by increasing a power output of the wind turbine. The method also includes calculating an available power of the wind turbine when operating in the spinning reserve mode. Further, the method includes defining a reliability band around the calculated available power based on data of real available power and calculated available power such that the real available power lies within an upper bound and a lower bound of the reliability band. In addition, the method includes selecting a reliability factor, wherein the reliability factor defines a probability that a reliable available power within the reliability band is below the real available power. The method further includes determining the reliable available power based on the selected reliability factor and the reliability band. Moreover, the method includes determining a power setpoint for the wind turbine based on a difference between a desired spinning reserve and the determined reliable available power. The method further includes controlling the wind turbine to operate in the spinning reserve mode in accordance with the power setpoint.

Another embodiment disclosed herein is directed to a power plant controller associated with a wind turbine. The power plant controller includes one or more processors and one or more non-transitory memory devices storing a program, which, when executed by any combination of the one or more processors, causes the one or more processors to perform an operation. The operation includes calculating an available power of a wind turbine operating in a spinning reserve mode to provide a spinning reserve, the spinning reserve being an extra power generating capacity of the wind turbine that is available by increasing a power output of the wind turbine; defining a reliability band around the calculated available power based on data of real available power and calculated available power such that the real available power lies within an upper bound and a lower bound of the reliability band; selecting a reliability factor, wherein the reliability factor defines a probability that a reliable available power within the reliability band is below the real available power; determining the reliable available power based on the selected reliability factor and the reliability band; determining a power setpoint for the wind turbine based on a difference between a desired spinning reserve and the determined reliable available power; and providing the power setpoint to the wind turbine so that the wind turbine is operated in the spinning reserve mode according to the power setpoint.

Yet another embodiment disclosed herein is directed to a computer program product comprising a non-transitory computer readable medium storing software code which, when executed on one or more processors, performs an operation. The operation includes calculating an available power of a wind turbine operating in a spinning reserve mode to provide a spinning reserve, the spinning reserve being an extra power generating capacity of the wind turbine that is available by increasing a power output of the wind turbine; defining a reliability band around the calculated available power based on data of real available power and calculated available power such that the real available power lies within an upper bound and a lower bound of the reliability band; selecting a reliability factor, wherein the reliability factor defines a probability that a reliable available power within the reliability band is below the real available power; determining the reliable available power based on the selected reliability factor and the reliability band; determining a power setpoint for the wind turbine based on a difference between a desired spinning reserve and the determined reliable available power; and providing the power setpoint to the wind turbine so that the wind turbine is operated in the spinning reserve mode according to the power setpoint.

A further embodiment disclosed herein is directed to a wind turbine. The wind turbine includes a rotor having a plurality of rotor blades and an electrical generator coupled with the rotor for generating electrical power. The wind turbine also includes a wind turbine controller having one or more processors and one or more non-transitory memory devices storing a program, which, when executed by any combination of the one or more processors, causes the one or more processors to perform an operation. The operation includes controlling the wind turbine to operate in a spinning reserve mode to provide a spinning reserve, the spinning reserve being an extra power generating capacity of the wind turbine that is available by increasing a power output of the wind turbine; calculating an available power of the wind turbine operating in the spinning reserve mode; defining a reliability band around the calculated available power based on data of real available power and calculated available power such that the real available power lies within an upper bound and a lower bound of the reliability band; selecting a reliability factor, wherein the reliability factor defines a probability that a reliable available power within the reliability band is below the real available power; determining the reliable available power based on the selected reliability factor and the reliability band; determining a power setpoint for the wind turbine based on a difference between a desired spinning reserve and the determined reliable available power; and controlling the wind turbine so that the wind turbine is operated in the spinning reserve mode according to the power setpoint.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A, 3B, and 3C provide various power versus time graphs according to various aspects of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Figure 1:
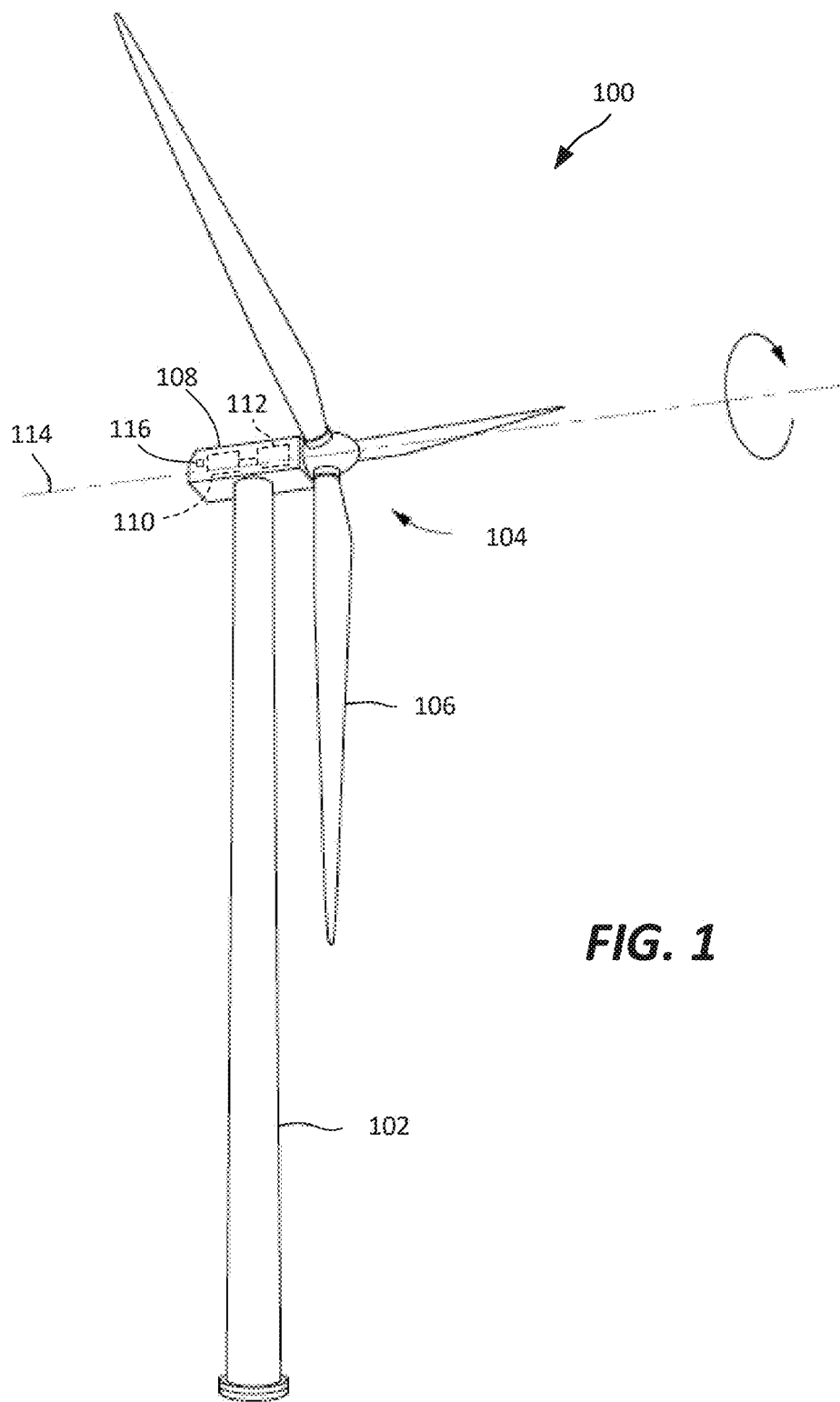
FIG. 1 is a perspective view of a wind turbine according to an embodiment of the present disclosure.

Control techniques are provided herein that allow for a reliability of a spinning reserve of a wind turbine to be tailored to a user's reliability preference. That is, the control techniques provided herein can allow a user to select a reliability factor that indicates a probability or confidence level of an actual or real spinning reserve of the wind turbine satisfying a desired spinning reserve. A spinning reserve represents an extra power generating capacity of the wind turbine that is available by increasing a power output of the wind turbine, e.g., in response to an under frequency event on a power grid to which the wind turbine is electrically connected.

A Transmission System Operator (TSO) can set or require the desired spinning reserve either as a fixed power value or a per unit value (e.g., as a percentage). A TSO may set penalties for not being able to deliver the power boost when needed. With the present control techniques, the reliability of the power plant to be able to comply with the desired spinning reserve of the TSO can be selected, e.g., by selecting the reliability factor. In this regard, the control techniques disclosed herein can quantify this risk and ensure that an owner/operator of a Wind Power Plant (WPP) defines the acceptable level of risk when required to operate with a spinning reserve. Generally, the owner/operator of the WPP wishes to have the smallest possible spinning reserve, as higher power contributions to the grid can be made, and thus higher earnings. An owner/operator of a WPP can thus consider factors in selecting the reliability factor, such as the probability that the spinning reserve is needed, to what extent it is needed, and the connected penalties, if any, for not complying. Accordingly, the control techniques disclosed herein offer flexibility in setting the spinning reserve reliability.

In one example aspect, a wind turbine can be operated in a spinning reserve mode to provide a spinning reserve, which as noted above, can represent an extra power generating capacity of the wind turbine that is available by increasing a power output of the wind turbine. An available power of the wind turbine when operating in the spinning reserve mode can be calculated. In an example the available power is calculated based on the wind speed (e.g. measured wind speed) and a power curve for the wind turbine. A reliability band can be defined around the calculated available power based on data of real available power and calculated available power such that the real available power lies within an upper bound and a lower bound of the reliability band. That is, the reliability band can have an upper bound and a lower bound that cover a range of real available power of the wind turbine. A reliability factor can be selected, e.g., by a user. The reliability factor defines a probability that a reliable available power within the reliability band is below the real available power, or stated differently, the reliability factor can indicate a desired reliability of an actual or real spinning reserve of the wind turbine satisfying a desired spinning reserve over a given time period and conditions present at the wind turbine. The reliable available power can be determined based on the selected reliability factor and the reliability band. A power setpoint for the wind turbine can be determined based on a difference between a desired spinning reserve and the determined reliable available power. A power plant controller can determine the power setpoint and can provide the power setpoint to a wind turbine controller of a wind turbine. The wind turbine controller can then operate the wind turbine in the spinning reserve mode according to the determined power setpoint.

The control techniques disclosed herein can provide certain advantages, benefits, and/or technical effects. For instance, the control techniques disclosed herein can allow for wind turbines to be controlled according to a user's spinning reserve reliability preference, or rather, according to a user's selected confidence level of a real spinning reserve satisfying a desired spinning reserve. This allows a TSO or other entity to select the proper balance of power production and spinning reserve reliability. In this way, power production can be increased when needed or spinning reserve reliability can be increased when needed. The reliability factor can be selected by a user or set automatically, e.g., based on a time of day, expected peak power demands, operating conditions associated with the wind turbines, power demand or frequency on the power grid, sensitivity of the power gird to spinning reserve reliability, a combination of the foregoing, etc. Moreover, the reliability factor can be used to determine a reliable available power, which may be deemed an available power determined according to a user's spinning reserve reliability preference. The reliable available power is determined within the bounds of a reliability band at some power level that is different than the power level corresponding to the calculated available power, and notably, used to determine the setpoint for a wind turbine. Consequently, control of a wind turbine can be controlled according to the spinning reserve reliability preference of a user. Overall, the control techniques disclosed herein can provide flexibility for entities to select, and adjust as needed, a desired balance between power production and spinning reserve reliability. The control techniques disclosed herein can have other associated advantages, benefits, and/or technical effects as well.

EXAMPLE EMBODIMENTS

FIG. 1 is a perspective view of a wind turbine 100 according to an embodiment of the present disclosure. The wind turbine 100, which may also be referred to as a Wind Turbine Generator (WTG), includes a tower 102 and a rotor 104 with at least one rotor blade 106. Although the rotor 104 is depicted with three (3) rotor blades 106 in FIG. 1, the rotor 104 can have more or less than three (3) rotor blades in other embodiments. The rotor 104 is connected to a nacelle 108 that is mounted on top of the tower 102. The rotor 104 drives an electrical generator 110 that is situated inside the nacelle 108. A gearbox 112 mechanically couples the rotor 104 with the electrical generator 110. The rotor 104 is rotatable around a rotor axis 114 by action of wind interacting with the rotor blades 106. The wind-induced rotational energy of the rotor blade(s) 106 is transferred via one or more shafts and/or gearing of the gearbox 112 to the electrical generator 110. Thus, the wind turbine 100 is capable of converting kinetic energy of the wind into mechanical energy by means of the rotor blade(s) 106, and subsequently, into electric power by means of the electrical generator 110.

The wind turbine 100 can also include a power converter having a rectifier that converts Alternating Current (AC) power from the electrical generator 110 into Direct Current (DC) power, and an inverter that converts the DC power into an AC power having desired characteristics. The AC power having the desired characteristics can be injected into a power grid.

The wind turbine 100 can include a wind turbine controller 116 to control respective components of the wind turbine 100 to generate power corresponding to a power request. In some embodiments, the wind turbine controller 116 can be implemented within a general controller. In other embodiments, the control elements of the wind turbine controller 116 can be implemented as separate control modules dedicated to controlling certain operation aspects of the wind turbine 100. For instance, the wind turbine controller 116 can include a dedicated pitch control module for controlling a pitch control system to pitch the blades 106, a dedicated yaw control module for controlling a yaw control system to adjust a yaw of the nacelle 108, etc.

As will be explained in greater detail herein, the wind turbine controller 116 can control the wind turbine 100 (e.g., according to a power setpoint provided by a Power Plant Controller (PPC)) to operate in a spinning reserve mode so as to provide a spinning reserve, and specifically, in accordance with a control technique that allows for a reliability of the spinning reserve to be tailored to a user's reliability preference. Generally, a spinning reserve represents an extra power generating capacity of a wind turbine that is available by increasing a power output of the wind turbine. A spinning reserve may be used to rapidly inject power into a power grid to compensate for power shortages or frequency drops on the power grid within a given period of time. A wind turbine operating in a spinning reserve mode is curtailed from a maximum power output to a lower power output by a spinning reserve power amount, hereby providing the possibility to rapidly increase the power output up to a maximum power output. Thus, the spinning reserve can be understood as a power reserve.

Figure 2:
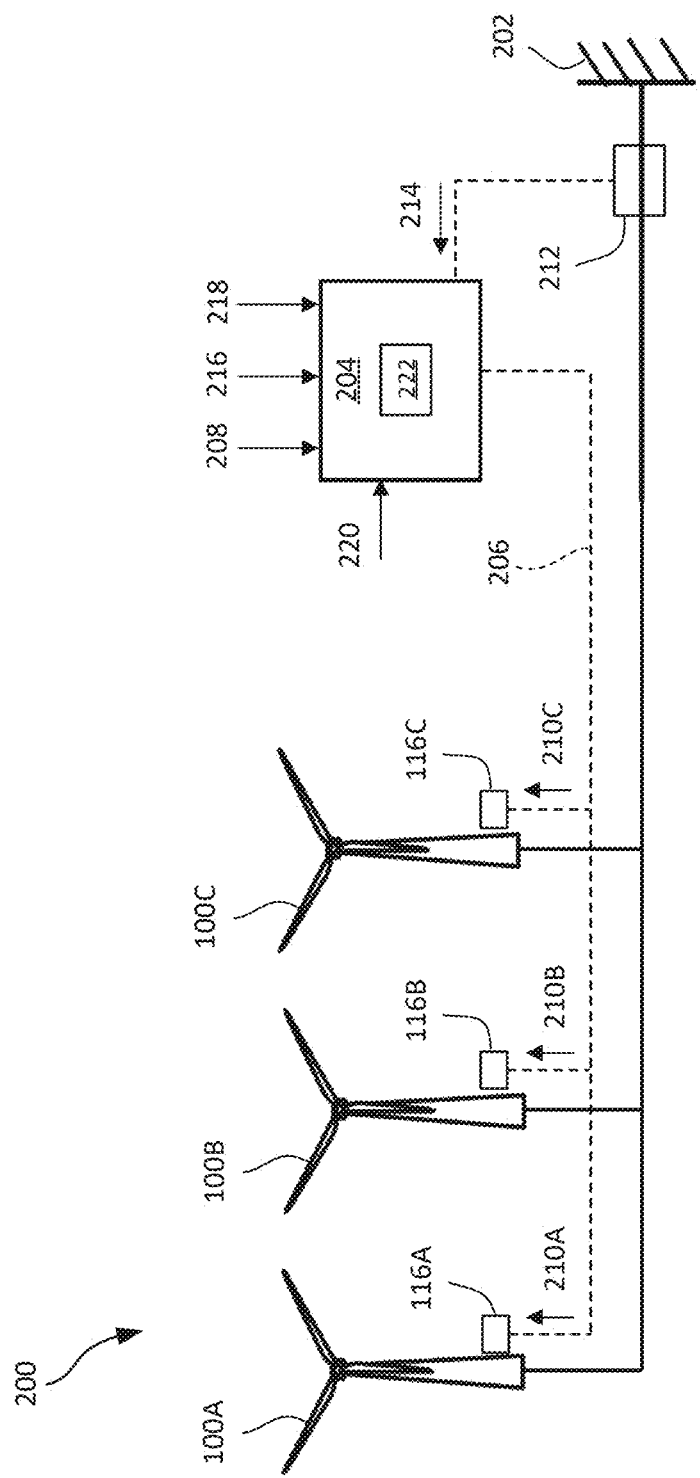
FIG. 2 is a schematic view of a power plant according to an embodiment of the present disclosure.

FIG. 2 is a schematic view of a power plant 200 arranged as a wind farm according to an embodiment of the present disclosure. The power plant 200 includes a plurality of wind turbines. In this example embodiment, the power plant 200 includes three (3) wind turbines, including a first wind turbine 100A, a second wind turbine 100B, and a third wind turbine 100C. The first, second, and third wind turbines 100A, 100B, 100C can each be constructed in a same or similar manner as the wind turbine 100 of FIG. 1. In other embodiments, however, the first, second, and/or third wind turbines 100A, 100B, 100C can have other configurations. Although three (3) wind turbines are depicted in FIG. 2, the power plant 200 can have more or less than three (3) wind turbines in other example embodiments.

The first, second, and third wind turbines 100A, 100B, 100C of the power plant 200 are electrically connectable with a power grid 202, e.g., via one or more electrical lines, switches, transformers, etc. In this way, electrical power generated by the first, second, and third wind turbines 100A, 100B, 100C can be supplied to the power grid 202. The power grid 202 can deliver electrical power to various loads.

Each one of the first, second, and third wind turbines 100A, 100B, 100C can include a wind turbine controller. For instance, the first wind turbine 100A has a first wind turbine controller 116A, the second wind turbine 100B has a second wind turbine controller 116B, and the third wind turbine 100C has a third wind turbine controller 116C. The wind turbine controllers 116A, 116B, 116C are operable to control controllable devices of their respective wind turbines 100A, 100B, 100C, e.g., based on control signals provided by a Power Plant Controller (PPC), or PPC 204. The PPC 204 can be communicatively coupled with the wind turbine controllers 116A, 116B, 116C, e.g., via a communication bus 206 including one or more wired and/or wireless communication lines. The PPC 204 is operable to control the power generation of the wind turbines 100A, 100B, 100C based at least in part on a power plant reference 208 that defines the desired power to be supplied to the power grid 202 from the power plant 200. Based at least in part on the power plant reference 208, the PPC 204 can generate and send control signal(s) (e.g., power setpoints 210A, 210B, 210C) to the wind turbine controllers 116A, 116B, 116C, and accordingly, the wind turbine controllers 116A, 116B, 116C can control controllable devices of their respective wind turbines 100A, 100B, 100C based on the control signals.

In addition, the PPC 204 can monitor a frequency of the power grid 202, e.g., by way of one or more sensors, represented by sensor 212 in FIG. 2. For instance, the sensor 212 can be implemented as one or more electric machines, inverters, and/or Phasor Measurement Units (PMUs) to execute Phase Locked Loops (PLLs) and/or Discrete Fourier Transforms (DFTs) to measure the frequency. An input 214 indicating the sensed frequency can be received by the PPC 204. When the frequency of the power grid 202 drops below a predetermined frequency, the PPC 204 can determine that an "under frequency event" associated with the power grid 202 is present. In some instances, to meet the power demand as specified by the power plant reference 208, the PPC 204 can control one or more of the first, second, and third wind turbines 100A, 100B, 100C to utilize their spinning reserves, or rather, increase their power outputs to rapidly inject power into the power grid 202 to compensate for the under frequency event. Accordingly, the first, second, and third wind turbines 100A, 100B, 100C can each be controlled to operate in a spinning reserve mode to provide a spinning reserve when needed.

A control technique that allows for a reliability of a spinning reserve of a wind turbine to be tailored to a user's reliability preference will now be described. The control technique will be described below with reference to the first wind turbine 100A of FIG. 2 as well as graphs 300A, 300B, 300C of FIGS. 3A, 3B, and 3C, but it will be appreciated that the second and third wind turbines 100B, 100C as well as other wind turbines having other configurations can be controlled in accordance with the disclosed control technique.

The control technique can include controlling the first wind turbine 100A to operate in a spinning reserve mode to provide a spinning reserve. The spinning reserve represents an extra power generating capacity of the first wind turbine 100A that is available by increasing a power output of the first wind turbine 100A. As one example, the spinning reserve can be set at 10 MW. As another example, the spinning reserve can be set at 8 MW. In operating in the spinning reserve mode, the first wind turbine 100A can be controlled to generate less power than the available power or maximum power-generating capacity. In this way, a spinning reserve can be provided and rapidly injected into the power grid 202 when needed, e.g., in response to an under frequency event. In at least some embodiments, the PPC 204 can send a power setpoint 210A to the first wind turbine controller 116A, and based on the power setpoint 210A, the first wind controller 116A can control the first wind turbine 100A to operate in a spinning reserve mode so as to provide a spinning reserve.

Figure 3A:
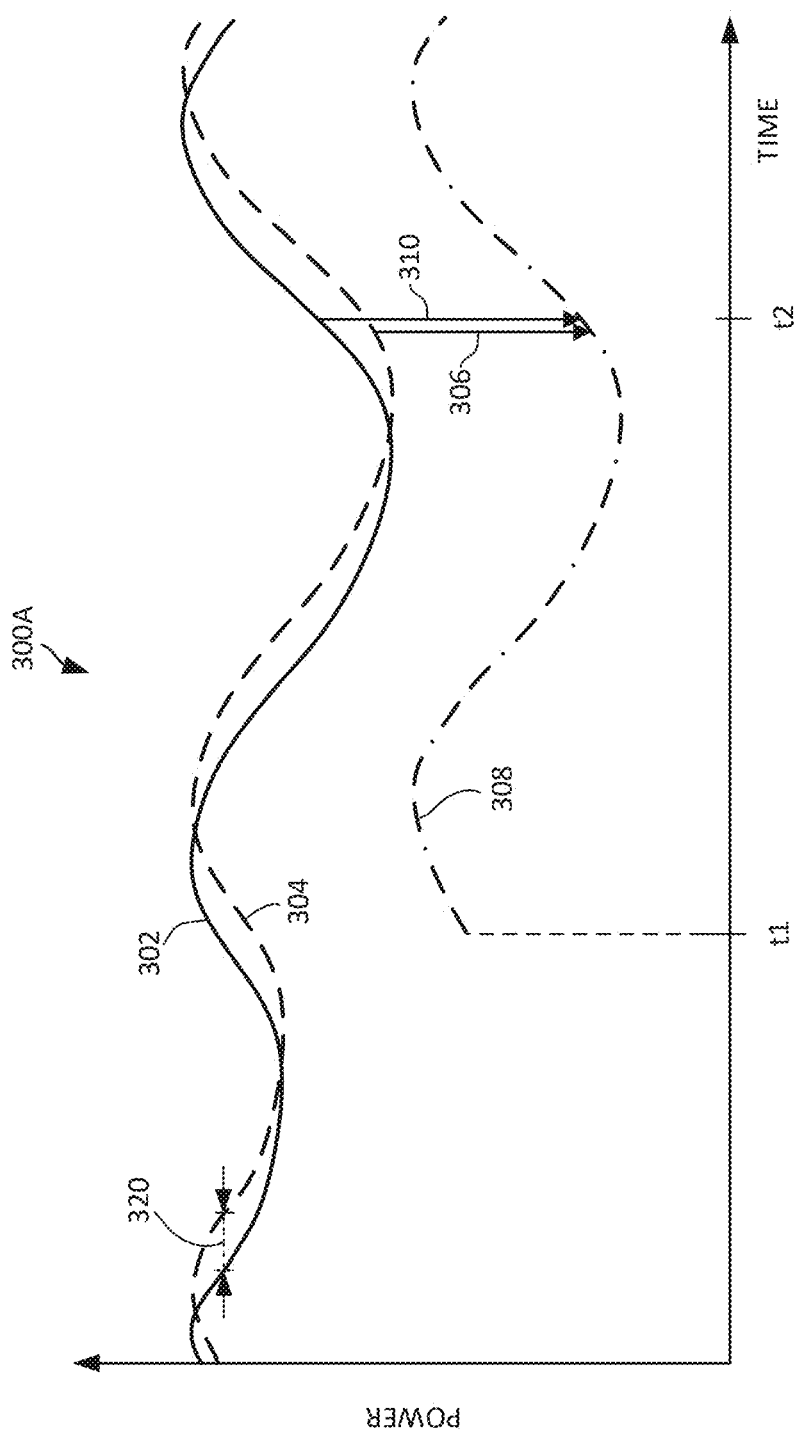

By way of example, and with reference to the graph 300A of FIG. 3A, prior to time t1, the first wind turbine 100A is operated in a full power mode. Accordingly, the power production of the first wind turbine 100A corresponds to a real available power 302. When a wind turbine is operating in a full power mode, it outputs the maximum possible power under the present conditions. Present conditions may in this regard be the current wind speed or any other specific limitation that the wind turbine must comply with under all circumstances. A calculated available power 304 can also be calculated during the full power mode, e.g., for determining a correlation or difference between the real available power 302 and the calculated available power 304 over a period of time, which can be used as historical data as will be explained further herein. As one example, the PPC 204 can determine the calculated available power 304 of the first wind turbine 100A according to one or more known techniques, such as by considering the density of the air, the swept area of the turbine blades of the first wind turbine 100A, and the velocity of the wind.

At time t1 in the graph 300A of FIG. 3A, the first wind turbine 100A can be controlled to operate in a spinning reserve mode to provide a spinning reserve. In some example embodiments, in operating the first wind turbine 100A in the spinning reserve mode, the power setpoint 210A can be determined based at least in part on the calculated available power 304.

Accordingly, the control technique can include, calculating an available power (i.e., the calculated available power 304) of the first wind turbine 100A when operating in the spinning reserve mode. The calculated available power 304 can be calculated according to one or more known techniques, as noted above. As illustrated in the graph 300A of FIG. 3A, the calculated available power 304 of the first wind turbine 100A can differ from the real available power 302 of the first wind turbine 100A. The power setpoint 210A can be determined based on a difference between a desired spinning reserve 306 and the calculated available power 304. For example, the desired spinning reserve 306 can be subtracted from the calculated available power 304. The difference between the desired spinning reserve 306 and the calculated available power 304 is a baseline power level 308 (or baseline power production level), and the power setpoint 210A can correspond to the baseline power level 308. The first wind turbine 100A can be operated according to the power setpoint 210A. In other embodiments, the first wind turbine 100A can be controlled to operate in a spinning reserve mode to provide a spinning reserve according to some other technique.

As further illustrated in FIG. 3A, an actual or real spinning reserve 310 can be determined as a difference between the real available power 302 and the baseline power level 308. The real spinning reserve 310 can differ from the desired spinning reserve 306 for a given point in time, as shown in FIG. 3A. For instance, at time t2, the real spinning reserve 310 is greater than the desired spinning reserve 306. In this regard, at time t2, the real spinning reserve 310 satisfies the desired spinning reserve 306, as represented by the real spinning reserve 310 having a greater vertical length than the vertical length of the desired spinning reserve 306 at time t2. Accordingly, there is sufficient power generating capacity at time t2 to satisfy the desired spinning reserve 306. At some time points, however, the real spinning reserve 310 may be less than the desired spinning reserve 306. In such instances, the real spinning reserve 310 does not satisfy the desired spinning reserve 306.

The control technique can include defining a reliability band around the calculated available power based on data of real available power and calculated available power such that the real available power lies within an upper bound and a lower bound of the reliability band. Stated differently, the reliability band is defined around the calculated available power and provides a range of power levels in which the real available power lies within according to some predefined probability, such as 99.99% or above certainty. By way of example, as shown in the graph 300B of FIG. 3B, a reliability band 314 is shown having an upper bound 316 and a lower bound 318 that cover a range of expected real available power of the first wind turbine 100A (FIG. 2). The upper and lower bounds 316, 318 of the reliability band 314 can be determined so as to be above and below the calculated available power 304, respectively. In some embodiments, a distance D1 between the upper bound 316 and the calculated available power 304 can be equal to a distance D2 between the lower bound 318 and the calculated available power 304. In other embodiments, the distance D1 between the upper bound 316 and the calculated available power 304 can be different than the distance D2 between the lower bound 318 and the calculated available power 304. Kalman filters or the like can be used to define the upper and lower bounds 316, 318.

In at least some embodiments, the data upon which the reliability band 314 is defined around the calculated available power 304 is historical data 218 (FIG. 2), such as historical data that describes how closely the calculated available power correlates with the real available power of a wind turbine operating at full power. Accordingly, historical data of the real available power and historical data of the calculated available power can be utilized to define a reliability band. The real available power can be represented by the actual power output of the wind turbine at full power. The full power output of a wind turbine can be described as the maximum power that the wind turbine can output under the current operating conditions, e.g., wind speed. Generally, the more closely the calculated available power correlates with the real available power (or the more accurate the calculated available power), the narrower the reliability band can be defined. Conversely, the less closely the calculated available power correlates with the real available power (or the more inaccurate the calculated available power), the wider the reliability band can be defined, e.g., so as to ensure that the real available power lies within the reliability band according to a predefined probability.

In some embodiments, for example, the upper bound 316 and the lower bound 318 of the reliability band 314 can be determined based at least in part on a difference between the real available power 302 and the calculated available power 304 of the first wind turbine 100A, as calculated when the first wind turbine 100A is operated at full power (e.g., as shown in FIG. 3A prior to time t1). The difference between the real available power 302 and the calculated available power 304 can indicate the accuracy of the calculated available power 304, or rather, how closely the calculated available power 304 tracks or correlates with the real available power 302. Accordingly, the reliability band 314 can be constructed based on historical data between the real and calculated available powers. The difference between the real available power and the calculated available power can be determined, e.g., for a plurality of sets of conditions. Further, in some embodiments, the average difference between the real available power 302 and the calculated available power 304 can be calculated over multiple different time periods at full power, such as multiple time periods of different operating runs of the first wind turbine 100A and/or similarly situated wind turbines (e.g., wind turbines with a same model, operating conditions, fielded years of service, a combination of the foregoing, etc.). In some embodiments, the difference between the real available power 302 and the calculated available power 304 is the average difference, and in a preferred embodiment, the average from each operating run can be averaged and utilized to define the reliability band 314.

Accordingly, the reliability band 314 can be based on a statistical analysis or the like defining the reliability or confidence interval of the calculated available power 304. That is, with the statistical analysis, the upper and lower bounds 316, 318 of the reliability band 314 can be determined to define the reliability band 314. The upper and lower bounds 316, 318 of the reliability band 314 can be dependent on several factors, including environmental factors (wind speed, direction, surface roughness, etc.) and other factors, such as the devices used and their behaviour (filters, relay time, sensor types, etc.).

Figure 4:
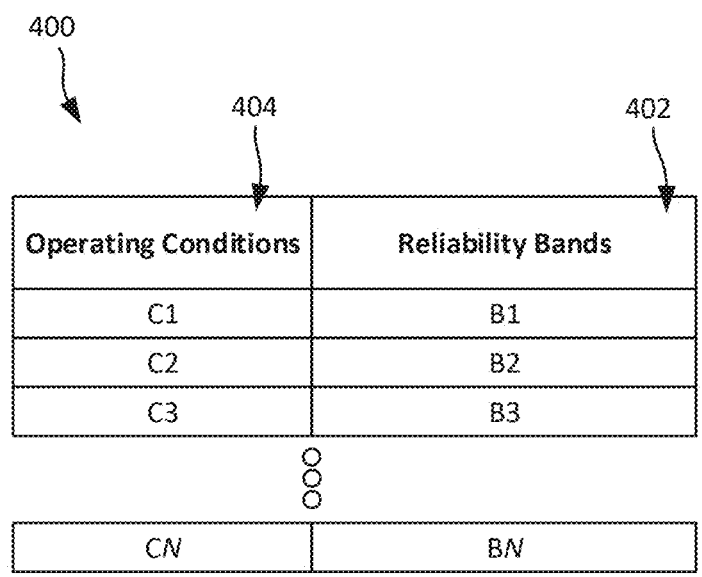
FIG. 4 depicts a library that corresponds predefined reliability bands with sets of operation conditions associated with a wind turbine according to various aspects of the present disclosure.

In yet other embodiments, the reliability band 314 can be determined by determining a set of operating conditions presently associated with the first wind turbine 100A and then selecting a predefined reliability band that corresponds with the set of operating conditions. The reliability band 314 can be determined as the predefined reliability band that corresponds with the set of operating conditions presently associated with the first wind turbine 100A. For example, as shown in FIG. 4, the predefined reliability band that corresponds with the set of operating conditions presently associated with the first wind turbine 100A can be selected from a library 400, which can be stored in a memory device of the PPC 204, for example. The library 400 corresponds predefined reliability bands 402 with sets of operating conditions 404. For instance, a first predefined reliability band B1 corresponds to a first set of operating conditions C1, a second predefined reliability band B2 corresponds to a second set of operating conditions C2, a third predefined reliability band B3 corresponds to a third set of operating conditions C3, and so on such that an Nth predefined reliability band BN corresponds to an Nth set of operating conditions CN, wherein N is an integer greater than one (1). The predefined reliability bands 402 can be based on historical data, for example. The predefined reliability bands 402 can be determined, e.g., based on historical data with a wind turbine being operated at full power, as described above.

In some other embodiments, as illustrated in FIG. 3A, a phase offset 320 can be determined between the calculated available power 304 and the real available power 302 of the first wind turbine 100A over a time period, as calculated when the first wind turbine 100A is operated at full power. In such embodiments, the reliability band 314 (FIGS. 3B, 3C) can be determined according to the phase offset 320. For instance, the upper and lower bounds 316, 318 can be determined with a corresponding phase offset to account for the phase offset 320 of the calculated available power 304 and real available power 302, as calculated with the first wind turbine 100A operating at full power.

In some further embodiments, the upper bound 316, the lower bound 318, or both can be dynamically adjustable. For instance, the upper bound 316, the lower bound 318, or both the upper and lower bounds 316, 318 of the reliability band 314 can be dynamically adjustable based at least in part on a feedback loop dependent on a measured power production 220 (FIG. 2). For instance, when the measured power production 220 of the first wind turbine 100A falls outside of an expected power production range, which can be determined based at least in part on operating conditions at the first wind turbine 100A and the power setpoint 210A for a given time point, the upper bound 316, the lower bound 318, or both 314, 316 can be dynamically adjusted, e.g., to widen or narrow the reliability band 314. Widening or narrowing the reliability band 314 can also affect a reliable available power (or power level thereof), which can ultimately affect the determination of the power setpoint 210A (e.g., for the next or future time points) and the power output of the first wind turbine 100A. One or both of the bounds 316, 318 can be dynamically adjusted so that the measured power production 220 falls within the expected power production range. In some further embodiments, the upper bound 316, the lower bound 318, or both the upper and lower bounds 316, 318 can be fixed relative to the calculated available power 304, e.g., for a predetermined time period, such as two hours.

The control technique can also include selecting a reliability factor, wherein the reliability factor defines a probability that a reliable available power within the reliability band is below the real available power. Stated differently, the reliability factor can indicate a desired reliability of an actual or real spinning reserve of the wind turbine satisfying a desired spinning reserve.

In some embodiments, a PPC associated with a wind turbine can select a reliability factor based on a user input. As one example, a user can input a percent of the time over a given time period that the actual spinning reserve should satisfy or is guaranteed to satisfy the desired spinning reserve. The PPC can receive the input and select the reliability factor accordingly. As another example, a user can input a value on a reliability scale. The PPC can receive the input, and based on the value, select the reliability factor. The user can provide an input on a user interface of a device (e.g., a computing device) communicatively coupled with the PPC, for example. In other embodiments, a wind turbine controller at the wind turbine can select the reliability factor based on an input by a user. In yet further embodiments, a PPC or wind turbine controller can automatically select the reliability factor, e.g., based on a time of day, expected peak power demands, operating conditions associated with the wind turbines, power demand or frequency on the power grid, sensitivity of the power gird to spinning reserve reliability, machine-learned behaviours indicating how the reliability factor has been selected in the past based on current conditions, a combination of the foregoing, etc.

By way of example, as shown in FIG. 2, an input 216 provided by a user can be received by the PPC 204. The input 216 can indicate a desired reliability of the spinning reserve satisfying the desired spinning reserve. Based on the input 216, the PPC 204 can select a reliability factor 222. Alternatively, the PPC 204 can automatically set the reliability factor 222, e.g., based on learned past settings for similar conditions. The reliability factor 222 can indicate a desired reliability of the spinning reserve satisfying the desired spinning reserve. In some embodiments, the reliability factor 222 can be represented as a percentage, e.g., as some number between 0 and 1 (with "1" corresponding to a power level associated with the lower bound 318 and "0" corresponding to a power level associated with the upper bound 316), or some other value or indicator representing the desired reliability of the spinning reserve satisfying the desired spinning reserve.

The control technique can further include determining a reliable available power based on the selected reliability factor and the reliability band. The reliable available power may be deemed an available power of a wind turbine according to a user's spinning reserve reliability preference. That is, the reliable available power reflects the available power of the wind turbine in view of the defined reliability band and selected reliability factor, which as noted above, indicates a desired reliability of the real spinning reserve satisfying the desired spinning reserve. The reliable available power can be determined so as to lie within the reliability band.

Figure 3B:
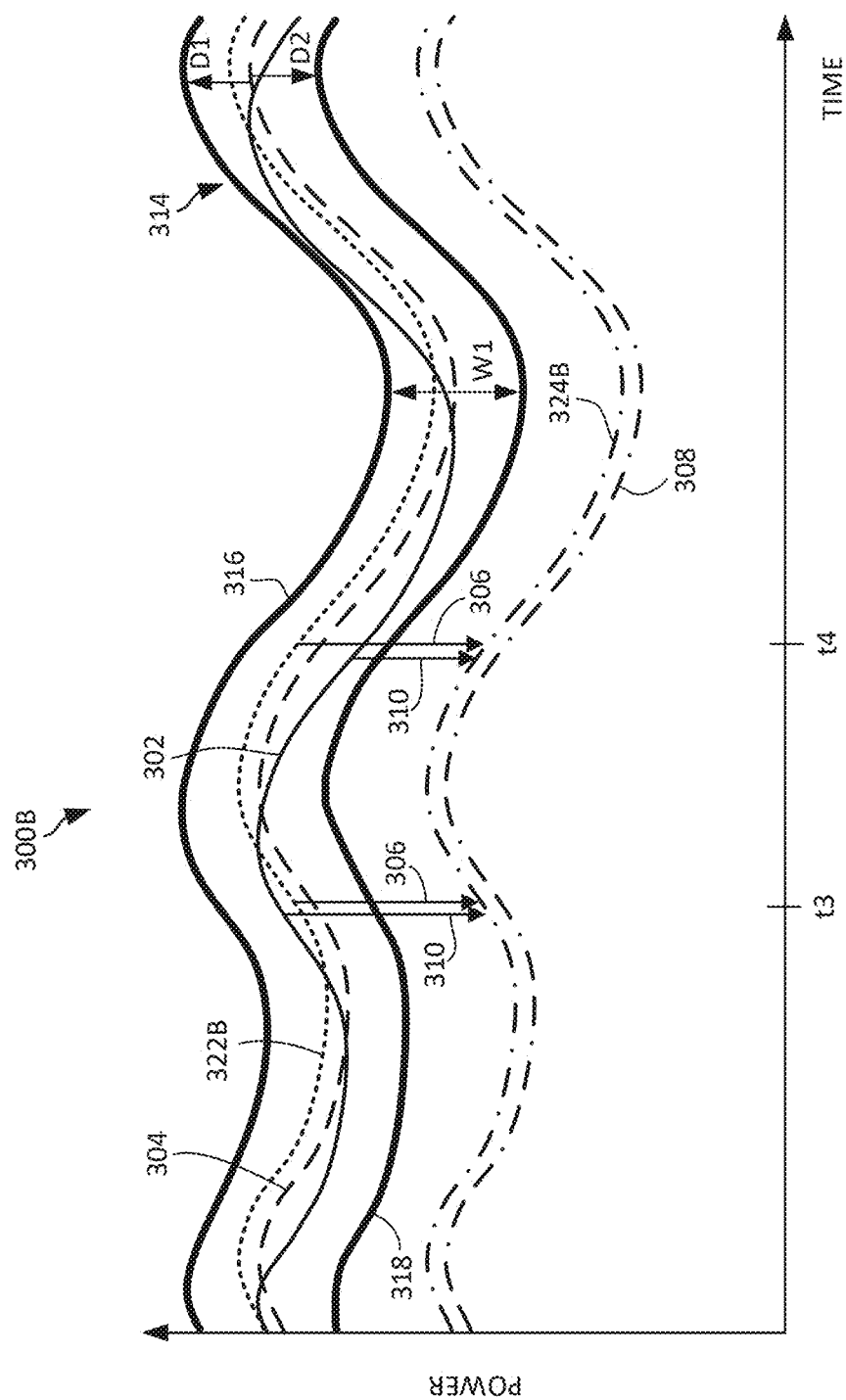

In some embodiments, the reliable available power can be determined based on the selected reliability factor and a width W1 of the defined reliability band 314, with the width W1 being defined as a difference between the upper and lower bounds 316, 318 as shown in FIG. 3B. The reliability factor can be used to determine where the reliable available power falls within the reliability band 314 relative to the upper and lower bounds 316, 318 while the width W1 of the reliability band 314 can be used to determine a magnitude of a deviation from the calculated available power 304. For a given reliability factor, the narrower the width W1 of the reliability band 314, the smaller the deviation from the calculated available power 304 the reliable available power is determined. In contrast, for the given reliability factor, the wider the width W1 of the reliability band 314, the larger the deviation from the calculated available power 304 the reliable available power is determined. Accordingly, the reliability factor and the width W1 of the reliability band 314 can be used to determine the reliable available power.

As one example, with the width W1 of the reliability band 314 defined as 10 MW and the reliability factor selected as 0.25 on a 0 to 1 predefined scale, with 1 corresponding to a power level associated with the lower bound 318, 0.5 corresponding to the calculated available power 304, and 0 corresponding to a power level associated with the upper bound 316, the deviation from the calculated available power 304 can be determined as 2.5 MW. Thus, the reliable available power can be determined at a power level corresponding to the calculated available power 304 plus 2.5 MW. As another example, with the width W1 of the reliability band 314 defined as 5 MW and the reliability factor selected as 0.25 on a 0 to 1 predefined scale, with 1 corresponding to a power level associated with the lower bound 318, 0.5 corresponding to the calculated available power 304, and 0 corresponding to a power level associated with the upper bound 316, the deviation from the calculated available power 304 can be determined as 1.25 MW. Thus, the reliable available power can be determined at a power level corresponding to the calculated available power 304 plus 1.25 MW. Therefore, as demonstrated by the examples above, the reliability factor and the width W1 of the defined reliability band 314 can be used to determine the power level of the reliable available power.

In some embodiments, the reliability factor is selected so that the reliable available power is determined at a power level that lies within the reliability band and is different than a power level corresponding to the calculated available power. However, in some instances, the reliable available power can be determined at a power level that lies within the reliability band and at a same power level as the calculated available power. In some other instances, the reliability factor can be selected so that the reliable available power is determined at a power level corresponding to a power level associated with the upper bound 316, a power level associated with the lower bound 318, or some power level therebetween. The reliability band 314, or bounds thereof, effectively constrains the determined reliable available power. In this regard, the reliability band 314 functions as a constraining mechanism, which can advantageously maintain the power and spinning reserve reliability within an acceptable balance. In some embodiments, the reliability factor is selectable as a value on a predefined scale (e.g., a predefined scale of 0-100, 0-10, etc.), with a lowest value of the predefined scale corresponding to the upper bound 316 and the highest value of the predefined scale corresponding to the lower bound 318, or vice versa, and with a middle value of the predefined scale corresponding to the calculated available power 304. In such embodiments, the reliable available power can be determined based on the selected value on the predefined scale, as explained above.

As one example and with reference to the graph 300B of FIG. 3B, a reliable available power 322B can be determined based at least in part on the selected reliability factor 222 (FIG. 2) so that the reliable available power 322B is arranged at a higher power level than the calculated available power 304. This can be done, for example, by selecting the reliability factor 222 as some number below 0.5 on a 0 to 1 predefined scale, with 1 corresponding to a power level associated with the lower bound 318 and 0 corresponding to a power level associated with the upper bound 316. This selected reliability factor 222 consequently leads to increased power production of the first wind turbine 100A but less reliability of the real spinning reserve 310 satisfying the desired spinning reserve 306, compared to a baseline scenario where a desired spinning reserve is subtracted from the calculated available power 304 to determine a setpoint for the wind turbine. The lesser reliability than the baseline scenario provided by the reliable available power 322B can be appreciated in the graph 300B of FIG. 3B, namely by comparing the percentage of time the reliable available power 322B is below the real available power 302 relative to the percentage of time the calculated available power 304 is below the real available power 302. In the graph 300B of FIG. 3B, the percentage of time the calculated available power 304 is below the real available power 302 is greater than the percentage of time the reliable available power 322B is below the real available power 302. Accordingly, the selected reliability factor 222 (FIG. 2) defines the probability that the reliable available power 322B within the reliability band 314 is below the real available power 302.

As another example and with reference to the graph 300C of FIG. 3C, a reliable available power 322C can be determined based at least in part on the selected reliability factor 222 (FIG. 2) so that the reliable available power 322C is arranged at a lower power level than the calculated available power 304. This can be done, for example, by selecting the reliability factor 222 as some number above 0.5 on a 0 to 1 predefined scale, with 1 corresponding to a power level associated with the lower bound 318 and 0 corresponding to a power level associated with the upper bound 316. This selected reliability factor 222 consequently leads to greater reliability of the real spinning reserve 310 satisfying the desired spinning reserve 306 but decreased power production of the first wind turbine 100A, compared to the baseline scenario. The greater reliability than the baseline scenario provided by the reliable available power 322C can be appreciated in the graph 300C of FIG. 3C, namely by comparing the percentage of time the reliable available power 322B is below the real available power 302 relative to the percentage of time the calculated available power 304 is below the real available power 302. In the graph 300C of FIG. 3C, the percentage of time the calculated available power 304 is below the real available power 302 is less than the percentage of time the reliable available power 322B is below the real available power 302. Stated differently, the percentage of time the reliable available power 322B is below the real available power 302 is greater than the percentage of time the calculated available power 304 is below the real available power 302, which effectively indicates increased reliability of the real spinning reserve 310 satisfying the desired spinning reserve 306. As noted above, the selected reliability factor 222 (FIG. 2) defines the probability that the reliable available power 322B within the reliability band 314 is below the real available power 302.

The control technique can further include determining a power setpoint for the wind turbine based on a difference between a desired spinning reserve and the determined reliable available power. For instance, the desired spinning reserve can be subtracted from the determined reliable available power. Stated differently, for a given time point, the desired spinning reserve (e.g., 8 MW) can be subtracted from the power level associated with the determined reliable available power at the given time point to determine the power setpoint. In some embodiments, the power setpoint 210A for the first wind turbine 100A can be determined by the PPC 204. The PPC 204 can provide the determined power setpoint 210A to the wind turbine controller 116A of the first wind turbine 100A. In other embodiments, the power setpoint 210A for the first wind turbine 100A can be determined by the wind turbine controller 116A of the first wind turbine 100A or by some other computing system associated with the first wind turbine 100A.

As one example, with reference to the graph 300B of FIG. 3B, at a given time point, the desired spinning reserve 306 can be subtracted from the reliable available power 322B. The difference of the subtraction operation corresponds to an increased power level 324B, which is increased or greater than the baseline power level 308 (determined by subtracting the desired spinning reserve 306 from the calculated available power 304). The power setpoint 210A can correspond to the increased power level 324B for a given time point. In this regard, the selected reliability factor 222 (FIG. 2) has led to increased power production of the first wind turbine 100A. At time t3, the real spinning reserve 310 satisfies the desired spinning reserve 306, as represented by the real spinning reserve 310 having a greater vertical length than the vertical length of the desired spinning reserve 306 at time t3. However, at other time points, such as at time t4, the real spinning reserve 310 may not satisfy the desired spinning reserve 306, as represented by the real spinning reserve 310 having a vertical length that is shorter than the vertical length of the desired spinning reserve 306 at time t4, or rather, when the real available power 302 is at a lower power level than the reliable available power 322B.

As another example, with reference to the graph 300C of FIG. 3C, at a given time point, the desired spinning reserve 306 is subtracted from the reliable available power 322C. The difference of the subtraction operation corresponds to a decreased power level 324C, which is decreased or less than the baseline power level 308 (determined by subtracting the desired spinning reserve 306 from the calculated available power 304). The power setpoint 210A can correspond to the decreased power level 324C at a given time point. In this regard, the selected reliability factor 222 (FIG. 2) can provide increased reliability, relative to baseline, but this increased reliability can lead to decreased power production of the first wind turbine 100A, relative to baseline. In most instances in the graph 300C, the real spinning reserve 310 satisfies the desired spinning reserve 306, such as at time t5 as represented by the real spinning reserve 310 having a greater vertical length than the vertical length of the desired spinning reserve 306. In some instances, however, the real spinning reserve 310 may not satisfy the desired spinning reserve 306, such as at time t6 as represented by the real spinning reserve 310 having a shorter vertical length than the vertical length of the desired spinning reserve 306, or rather, when the real available power 302 is at a lower power level than the reliable available power 322C.

The control technique can further include controlling the wind turbine to operate in accordance with the power setpoint. For instance, the PPC 204 can determine the power setpoint 210A and the determined power setpoint 210A can be provided to the first wind turbine controller 116A of the first wind turbine 100A by way of the communication bus 206. The first wind turbine controller 116A can then control the first wind turbine 100A in accordance with the received power setpoint 210A. To achieve or drive toward the power setpoint 210A, the blades of the first wind turbine 100A can be controlled to pitch, the yaw system can be controlled to adjust a yaw of the nacelle, etc. In some embodiments, controlling the first wind turbine 100A to operate in accordance with the power setpoint 210A can cause an increase in a power output of the first wind turbine 100A, relative to the baseline scenario. In some embodiments, controlling the first wind turbine 100A to operate in accordance with the power setpoint 210A can cause a decrease in the power output of the first wind turbine 100A, relative to the baseline scenario. In yet other embodiments, controlling the first wind turbine 100A to operate in accordance with the power setpoint 210A can cause no change in the power output of the first wind turbine 100A, relative to the baseline scenario.

In addition, in some embodiments, the PPC 204 can control a plurality of wind turbines according to the above disclosed control technique. For the instance, the PPC 204 can control each of the first, second, and third wind turbines 100A, 100B, 100C according to the control technique. In such embodiments, the PPC 204 is, for each wind turbine 100A, 100B, 100C, configured to: calculate, for a given wind turbine of the plurality of wind turbines, an available power of the given wind turbine when operating in a spinning reserve mode; define a reliability band around the calculated available power for the given wind turbine based on data of real available power and calculated available power such that the real available power lies within an upper bound and a lower bound of the reliability band for the given wind turbine; select a reliability factor, wherein the reliability factor defines a probability that a reliable available power within the reliability band for the given wind turbine is below the real available power; determine the reliable available power for the given wind turbine based on the selected reliability factor and the reliability band; determine a power setpoint for the given wind turbine based on a difference between a desired spinning reserve and the determined reliable available power for the given wind turbine; and provide the power setpoints to the wind turbine controllers of respective ones of the plurality of wind turbines so that the wind turbines can be operated according to their respective power setpoints. Accordingly, the wind turbines 100A, 100B, 100C can be operated in their respective spinning reserve modes according to control technique disclosed herein.

Figure 5:
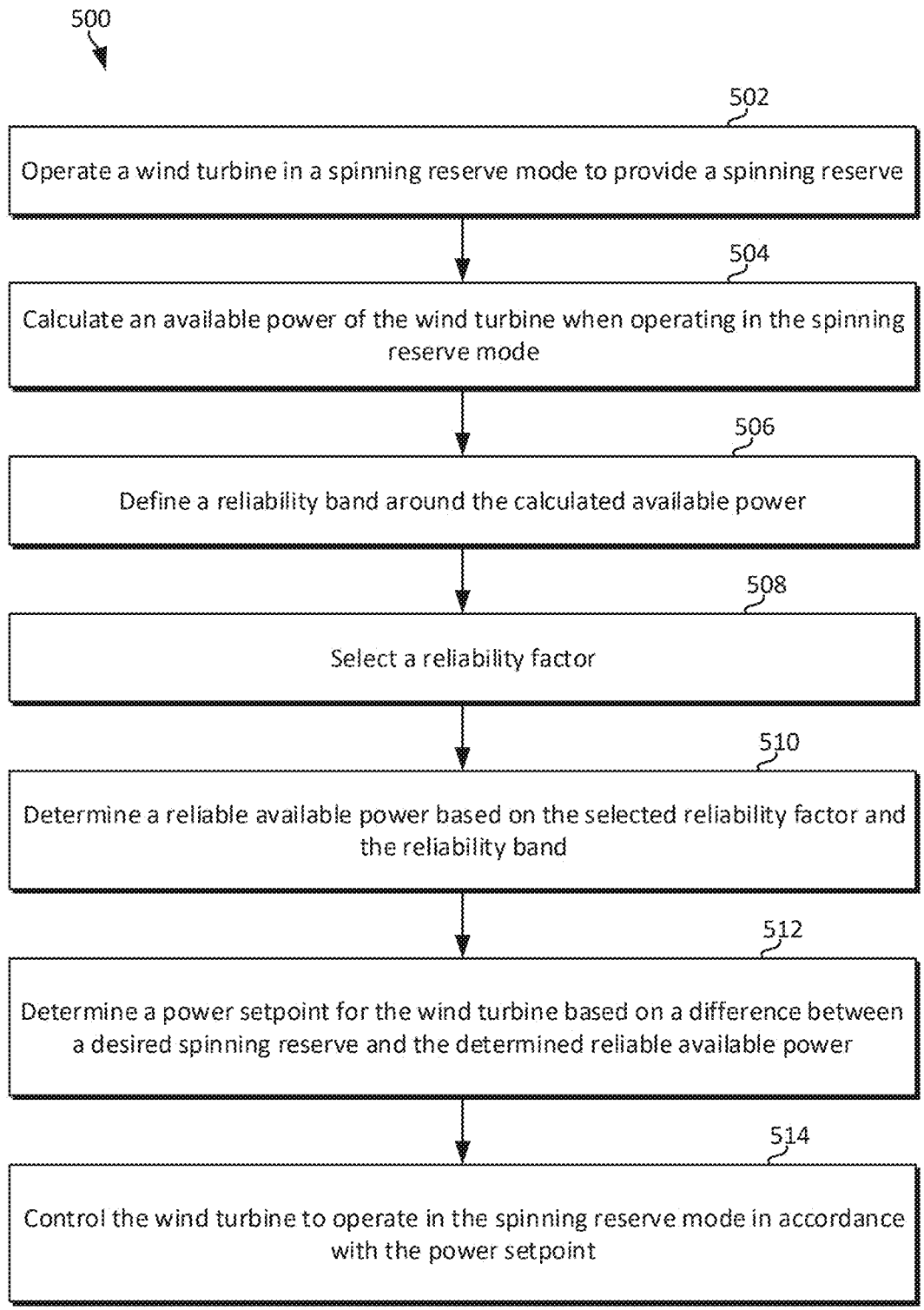
FIG. 5 is a flow diagram for a method of operating a wind turbine in a spinning reserve mode to provide a spinning reserve tailored to a user's reliability preference, according an example aspect of the present disclosure.

FIG. 5 is a method 500 of operating a wind turbine in a spinning reserve mode to provide a spinning reserve tailored to a user's spinning reserve reliability preference. The method 500 can be implemented to control any of the wind turbines disclosed herein as well as wind turbines having other configurations.

At 502, the method 500 can include operating a wind turbine in a spinning reserve mode to provide a spinning reserve. The spinning reserve represents an extra power generating capacity of the wind turbine that is available by increasing a power output of the wind turbine. For instance, a TSO may set a desired spinning reserve and the wind turbine can be controlled in a spinning reserve mode to satisfy, to an extent possible, the desired spinning reserve mode.

At 504, the method 500 can include calculating an available power of the wind turbine when operating in the spinning reserve mode. For instance, the available power of the wind turbine can be calculated by known techniques, such as by considering the power curve of the wind turbine, the density of the air, the swept area of the turbine blades of the wind turbine, and/or the velocity of the wind. The calculated available power can be utilized to define a reliability band.

At 506, the method 500 can include defining a reliability band around the calculated available power based on data of real available power and calculated available power such that the real available power lies within an upper bound and a lower bound of the reliability band. In at least some example implementations, the reliability band can include an upper bound and a lower bound. The upper and lower bounds of the reliability band can be determined so as to be above and below the calculated available power, respectively. In some implementations, a distance between the upper bound and the calculated available power can be equal to a distance between the lower bound and the calculated available power. In other implementations, the distance between the upper bound and the calculated available power can be different than the distance between the lower bound and the calculated available power. A width of the reliability band is defined as a difference between the upper and lower bounds.

In some implementations, the upper bound and the lower bound of the reliability band can be determined based at least in part on a difference between a real available power and a calculated available power of the wind turbine over a previous time period (i.e., historical data) with the wind turbine being operated at full power. For instance, an average difference can be determined over the previous time period. The difference, or average thereof, can be used to determine the width of the reliability band, or rather, how to define the upper and lower bounds of the reliability band. In some implementations, the difference can be taken as an average difference over multiple time periods while the wind turbine is operated at full power. Further, in some implementations, the historical data can indicate a difference (or average thereof) between the real available power and the calculated available power of at least one of one or more other wind turbines being operated at full power, with the one or more other wind turbines being of a similar type (e.g., a same or similar model, a same or similar configuration, a same or similar location, same or similar environmental factors, some combination of the foregoing, etc.) with respect to the wind turbine. Accordingly, historical data of the real available power and historical data of the calculated available power can be utilized to define the reliability band. In some implementations, defining the reliability band can include determining a difference between the historical real available power and the historical calculated available power, with the historical data being based on measurements from at least one of: 1) the wind turbine over a previous time period with the wind turbine being operated at full power in which the wind turbine operates in a full power mode to output a maximum possible power under conditions present at the wind turbine; and 2) one or more other wind turbines each being operated at full power, with each one of the one or more other wind turbines being operated at full power so that, for a given other wind turbine of the one or more other wind turbines, the given other wind turbine operates in a full power mode to output a maximum possible power under conditions present at the given other wind turbine. The one or more other wind turbines can be of a similar type with respect to the wind turbine.

In some implementations, the reliability band can be determined by: determining a set of operating conditions (e.g., wind speed, wind direction, presence of turbulence, etc.) presently associated with the wind turbine; and selecting a predefined reliability band that corresponds with the set of operating conditions, the predefined reliability band being selected from a library of predefined reliability bands that each correspond with a predefined set of operating conditions. The reliability band can be determined as the predefined reliability band. The predefined reliability bands can be determined, e.g., based on historical data captured with the wind turbine or other similar wind turbines operating at full power.

In some further implementations, the upper bound, the lower bound, or both can be dynamically adjustable. For instance, the upper bound, the lower bound, or both bounds of the reliability band can be dynamically adjustable based at least in part on a feedback loop dependent on a measured power production. For instance, when the measured power production of the wind turbine falls outside of an expected power production range, which can be determined based at least in part on operating conditions at the wind turbine and a current power setpoint, the upper bound, the lower bound, or both can be dynamically adjusted, e.g., to widen or narrow the reliability band. Widening or narrowing the reliability band can also affect the reliable available power (or power level thereof), which can ultimately affect the determination of the power setpoint and the power output of the wind turbine. One or both of the bounds can be dynamically adjusted so that the measured power production falls within an expected power production range.

In some further implementations, the upper bound, the lower bound, or both the upper and lower bounds can be fixed relative to the calculated available power for a predetermined time period, e.g., two hours, twenty minutes, five minutes, etc. In some implementations, the upper bound, the lower bound, or both can be switchable between being fixed and dynamically adjustable.

In some further implementations, the reliability band can be determined by: determining a phase offset between a calculated available power and a real available power of the wind turbine over a time period at full power, wherein the reliability band is determined according to the phase offset. The upper and lower bands of the reliability bands can be determined with a phase offset to account for the phase offset between the calculated available power and the real available power as determined at full power.

Any combination of the above-noted techniques for defining the reliability band can be implemented.

At 508, the method 500 can include selecting a reliability factor, wherein the reliability factor defines a probability that a reliable available power within the reliability band is below the real available power. For instance, a user can provide an input, e.g., to a user interface communicatively coupled with a PPC associated with the wind turbine. The user interface can be embodied as a computer, a mobile electronic device, etc. The input provided by the user can indicate a desired reliability of the actual spinning reserve satisfying a desired spinning reserve. As one example, a user can input a percent of the time over a given time period (e.g., an upcoming period of time) that the actual spinning reserve should satisfy or is guaranteed to satisfy the desired spinning reserve. As another example, a user can input a value on a reliability scale. The PPC can receive the input and can select the reliability factor accordingly.

At 510, the method 500 can include determining the reliable available power based on the selected reliability factor and the reliability band. For instance, in some implementations, the reliable available power can be determined based on the selected reliability factor and a width of the defined reliability band, with the width being defined as a difference between the upper and lower bounds of the reliability band. The reliability factor can be used to determine where the reliable available power falls within the reliability band relative to the upper and lower bounds while the width of the reliability band can be used to determine a magnitude of a deviation from the calculated available power.

As one example, with the width of the reliability band 314 defined as 3 MW and the reliability factor selected as 0.75 on a 0 to 1 predefined scale, with 1 corresponding to a power level associated with the lower bound, 0.5 corresponding to the calculated available power, and 0 corresponding to a power level associated with the upper bound, the deviation from the calculated available power can be determined as 0.75 MW. Thus, the reliable available power can be determined at a power level corresponding to the calculated available power less 0.75 MW. As another example, with the width of the reliability band defined as 5 MW and the reliability factor selected as 0.1 on a 0 to 1 predefined scale, with 1 corresponding to a power level associated with the lower bound, 0.5 corresponding to the calculated available power, and 0 corresponding to a power level associated with the upper bound, the deviation from the calculated available power can be determined as 2 MW. Thus, the reliable available power can be determined at a power level corresponding to the calculated available power plus 2 MW. Accordingly, the reliability factor and the width of the defined reliability band can be used to determine the power level of the reliable available power.

In some implementations, the reliability factor is selected so that a reliable available power is determined at a power level that lies within the reliability band and is different than a power level corresponding to the calculated available power. In some aspects, the reliability factor can be selected so that the reliable available power is determined at a power level that corresponds with the upper bound of the reliability band. In some aspects, the reliability factor can be selected so that the reliable available power is determined at a power level that corresponds with the lower bound of the reliability band. In yet other aspects, the reliability factor can be selected so that the reliable available power is determined at a power level that corresponds with a power level that is between the upper and lower bounds of the reliability band but that does not correspond with the power level corresponding to the calculated available power. In yet further aspects, the reliability factor can be selected so that the reliable available power is determined at a power level that corresponds with a power level of the calculated available power.

In some further implementations, the reliability factor is selectable as a value on a predefined scale, with a lowest value of the predefined scale corresponding to the upper bound and a highest value of the predefined scale corresponding to the lower bound, or vice versa, and with a middle value of the predefined scale corresponding to the calculated available power. In such implementations, the reliable available power can be determined based on the selected value on the predefined scale.

At 512, the method 500 can include determining a power setpoint for the wind turbine based on a difference between a desired spinning reserve and the determined reliable available power. For instance, the desired spinning reserve can be subtracted from the determined reliable available power. Stated differently, for a given time point, the desired spinning reserve (e.g., 8 MW set by a TSO or other entity) can be subtracted from the power level associated with the determined reliable available power at the given time point to determine the power setpoint. In some implementations, the power setpoint for the wind turbine can be determined by a PPC. In such implementations, the method 500 can include providing, by the PPC, the determined power setpoint to a wind turbine controller of the wind turbine. In other implementations, the power setpoint for the wind turbine can be determined by the wind turbine controller of the wind turbine or by some other computing system associated with the wind turbine.

At 514, the method 500 can include controlling the wind turbine to operate in the spinning reserve mode in accordance with the power setpoint. For instance, a PPC can provide the power setpoint to a wind turbine controller of the wind turbine, and the wind turbine controller can control controllable devices (e.g., pitch actuators, switches of a power converter, a yaw control system, etc.) of the wind turbine in accordance with the power setpoint. In some implementations, the wind turbine can be operated in the spinning reserve mode according to the power setpoint so that the power output of the wind turbine can change, e.g., relative to baseline.

In some implementations, controlling the wind turbine to operate in accordance with the power setpoint can include increasing a power output of the wind turbine. For instance, the method 500 can include selecting the reliability factor so that the power setpoint is determined at a power level that is greater than a baseline power level, with the baseline power level being determined based on a difference between the desired spinning reserve and the calculated available power. With the power setpoint being determined at a greater power level than the baseline power level, the power output of the wind turbine can be increased, relative to baseline.

In other implementations, controlling the wind turbine to operate in accordance with the power setpoint can include decreasing a power output of the wind turbine. For instance, the method 500 can include selecting the reliability factor so that the power setpoint is determined at a power level that is less than a baseline power level, with the baseline power level being determined based on a difference between the desired spinning reserve and the calculated available power. With the power setpoint being determined at a lesser power level than the baseline power level, the power output of the wind turbine can be decreased, relative to baseline, but the reliability of the real spinning reserve satisfying the desired spinning reserve can be increased, relative to baseline.

In some further implementations, the wind turbine can be one of a plurality of wind turbines communicatively coupled with a PPC. The PPC can be, for each wind turbine of the plurality of wind turbines, configured to: calculate, for a given wind turbine of the plurality of wind turbines, an available power of the given wind turbine when operating in a spinning reserve mode; define a reliability band around the calculated available power for the given wind turbine based on data of real available power and calculated available power such that the real available power lies within an upper bound and a lower bound of the reliability band for the given wind turbine; select a reliability factor, wherein the reliability factor defines a probability that a reliable available power within the reliability band for the given wind turbine is below the real available power; determine the reliable available power for the given wind turbine based on the selected reliability factor and the reliability band; determine a power setpoint for the given wind turbine based on a difference between a desired spinning reserve and the determined reliable available power for the given wind turbine; and provide the power setpoints to the wind turbine controllers of respective ones of the plurality of wind turbines so that the wind turbines can be operated according to their respective power setpoints. Accordingly, the power setpoints can be used by the wind turbines to operate in respective spinning reserve modes so as to provide spinning reserves according to the reliability factor.

Figure 6:
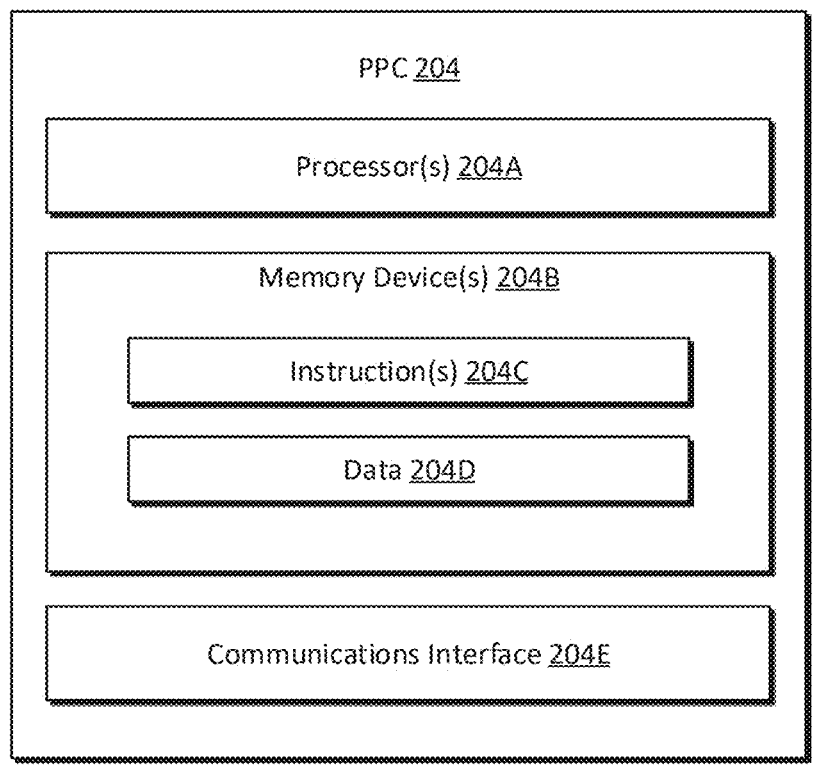
FIG. 6 is a block diagram of the power plant controller of FIG. 2.

FIG. 6 is a block diagram of the PPC 204 of FIG. 2 according to example aspects of the present disclosure.

As shown in FIG. 6, the PPC 204 can include one or more processor(s) 204A and one or more memory device(s) 204B. The one or more processor(s) 204A can include any suitable processing device, such as a microprocessor, microcontroller, integrated circuit, logic device, or other suitable processing device. The one or more memory device(s) 204B can include one or more computer-readable medium, including, but not limited to, non-transitory computer-readable medium, RAM, ROM, hard drives, flash drives, and other memory devices.

The one or more memory device(s) 204B can store information accessible by the one or more processor(s) 204A, including computer-readable instructions 204C that can be executed by the one or more processor(s) 204A. The instructions 204C can be any set of instructions, such as a program for controlling wind turbine(s) in a spinning reserve mode that provides a spinning reserve having a reliability tailored a user's reliability preference. When the instructions 204C are executed by the one or more processor(s) 204A, the one or more processor(s) 204A can cause operations to be performed. The instructions 204C can be software written in any suitable programming language or can be implemented in hardware.

The memory device(s) 204B can further store data 204D that can be accessed by the processors 604. For example, the data 204D can include sensor data, model data, logic data, historical data, etc., as described herein. The data 204D can include one or more table(s), function(s), algorithm(s), model(s), equation(s), etc. according to example aspects of the present disclosure.

The PPC 204 can also include a communication interface 204E used to communicate, for example, with the other components of the system. The communication interface 204E can include any suitable components for interfacing with one or more network(s), including for example, transmitters, receivers, transceivers, ports, controllers, antennas, or other suitable components.

The wind turbine controllers 116A-116C can be configured in a same or similar manner as the PPC 204 of FIG. 6.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present subject matter may be a system, a method, and/or a computer program product. The computer program product may include a computer-readable storage medium (or media) (e.g., a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) having computer readable program instructions thereon for causing a processor to carry out aspects of the present disclosure.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method, comprising:
    operating a wind turbine in a spinning reserve mode to provide a spinning reserve, the spinning reserve being an extra power generating capacity of the wind turbine that is available by increasing a power output of the wind turbine;
    calculating an available power of the wind turbine when operating in the spinning reserve mode;
    defining a reliability band around the calculated available power based on data of real available power and calculated available power such that the real available power lies within an upper bound and a lower bound of the reliability band;
    selecting a reliability factor, wherein the reliability factor defines a probability that a reliable available power within the reliability band is below the real available power;
    determining the reliable available power based on the selected reliability factor and the reliability band;
    determining a power setpoint for the wind turbine based on a difference between a desired spinning reserve and the determined reliable available power; and
    controlling the wind turbine to operate in the spinning reserve mode in accordance with the power setpoint.

2. The method of claim 1, wherein the reliability factor is selected so that the reliable available power is determined at a power level that lies within the reliability band and is different than a power level corresponding to the calculated available power.

3. The method of claim 1, wherein the reliability factor is selected so that the power setpoint is determined at a power level that is greater than a baseline power level, with the baseline power level being determined based on a difference between the desired spinning reserve and the calculated available power.

4. The method of claim 1, wherein the reliability factor is selected so that the power setpoint is determined at a power level that is less than a baseline power level, with the baseline power level being determined based on a difference between the desired spinning reserve and the calculated available power.

5. The method of claim 1, wherein the reliability factor is selectable as a value on a predefined scale, with a lowest value of the predefined scale corresponding to the upper bound and a highest value of the predefined scale corresponding to the lower bound, or vice versa, and with a middle value of the predefined scale corresponding to the calculated available power, and wherein the reliable available power is determined based on the selected value on the predefined scale.

6. The method of claim 1, wherein the upper bound and the lower bound of the reliability band are determined so as to be above and below the calculated available power, respectively, and wherein the reliable available power is determined so as to correspond to a power level associated with the upper bound, the lower bound, or some power level therebetween.

7. The method of claim 1, wherein the reliable available power is determined based at least in part on the selected reliability factor and a width of the defined reliability band.

8. The method of claim 1, wherein the upper bound, the lower bound, or both are fixed relative to the calculated available power at least for a predetermined time period.

9. The method of claim 1, wherein the upper bound, the lower bound, or both are dynamically adjustable based at least in part on a feedback loop dependent on a measured power production of the wind turbine.

10. The method of claim 9, further comprising:
    determining whether the measured power production of the wind turbine falls outside of an expected power production range determined based at least in part on operating conditions at the wind turbine and a current power setpoint; and
    dynamically adjusting the upper bound, the lower bound, or both.

11. The method of claim 1, wherein the data is historical data of the real available power and the calculated available power.

12. The method of claim 11, wherein defining the reliability band comprises:
    determining a difference between the historical real available power and the historical calculated available power, wherein the historical data is based on measurements from at least one of:
        the wind turbine over a previous time period with the wind turbine being operated at full power in which the wind turbine operates in a full power mode to output a maximum possible power under conditions present at the wind turbine; and
        one or more other wind turbines each being operated at full power, with each one of the one or more other wind turbines being operated at full power so that, for a given other wind turbine of the one or more other wind turbines, the given other wind turbine operates in a full power mode to output a maximum possible power under conditions present at the given other wind turbine, wherein the one or more other wind turbines are of a similar type with respect to the wind turbine.

13. The method of claim 1, wherein defining the reliability band comprises:
    determining a set of operating conditions presently associated with the wind turbine; and
    selecting a predefined reliability band that corresponds with the set of operating conditions, the predefined reliability band being selected from a library of predefined reliability bands that each correspond with a predefined set of operating conditions, and
    wherein the reliability band is defined as the selected predefined reliability band.

14. The method of claim 1, wherein defining the reliability band comprises:
   determining a phase offset between the calculated available power and a real available power of the wind turbine over a time period, as calculated when the wind turbine is operated at full power,
   wherein the upper and lower bounds are determined with a phase offset corresponding to the phase offset between the calculated available power and the real available power of the wind turbine over the time period, as calculated when the wind turbine is operated at full power.

15. The method of claim 1, wherein the power setpoint for the wind turbine is determined by a power plant controller, and wherein the method further comprises:
   providing, by the power plant controller, the power setpoint to a wind turbine controller of the wind turbine, and
   wherein the wind turbine is controlled by the wind turbine controller to operate in the spinning reserve mode in accordance with the power setpoint provided by the power plant controller.

16. A power plant controller associated with a wind turbine, comprising:
   one or more processors;
   one or more non-transitory memory devices storing a program, which, when executed by any combination of the one or more processors, causes the one or more processors to perform an operation, the operation comprising:
   calculating an available power of a wind turbine operating in a spinning reserve mode to provide a spinning reserve, the spinning reserve being an extra power generating capacity of the wind turbine that is available by increasing a power output of the wind turbine;
   defining a reliability band around the calculated available power based on data of real available power and calculated available power such that the real available power lies within an upper bound and a lower bound of the reliability band;
   selecting a reliability factor, wherein the reliability factor defines a probability that a reliable available power within the reliability band is below the real available power;
   determining the reliable available power based on the selected reliability factor and the reliability band;
   determining a power setpoint for the wind turbine based on a difference between a desired spinning reserve and the determined reliable available power; and
   providing the power setpoint to the wind turbine so that the wind turbine is operated in the spinning reserve mode according to the power setpoint.

* * * * *